United States Patent
Lu

(10) Patent No.: US 11,792,683 B2
(45) Date of Patent: Oct. 17, 2023

(54) METHOD FOR DATA PROCESSING, TERMINAL DEVICE, AND STORAGE MEDIUM

(71) Applicant: GUANGDONG OPPO MOBILE TELECOMMUNICATIONS CORP., LTD., Guangdong (CN)

(72) Inventor: Qianxi Lu, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 39 days.

(21) Appl. No.: 17/099,742

(22) Filed: Nov. 16, 2020

(65) Prior Publication Data

US 2021/0076255 A1 Mar. 11, 2021

Related U.S. Application Data

(63) Continuation of application No. PCT/CN2018/112648, filed on Oct. 30, 2018.

(51) Int. Cl.
*H04W 28/06* (2009.01)
*H04W 76/27* (2018.01)
*H04W 80/02* (2009.01)

(52) U.S. Cl.
CPC ........... *H04W 28/06* (2013.01); *H04W 76/27* (2018.02); *H04W 80/02* (2013.01)

(58) Field of Classification Search
CPC ...... H04W 28/06; H04W 76/27; H04W 80/02
USPC ....................................................... 370/329
See application file for complete search history.

(56) References Cited

U.S. PATENT DOCUMENTS

| 8,605,674 B2 | 12/2013 | Park et al. |
| 2019/0098682 A1* | 3/2019 | Park ........................ H04L 1/08 |
| 2020/0029379 A1 | 1/2020 | Xiao et al. |

(Continued)

FOREIGN PATENT DOCUMENTS

| CN | 101931442 | 12/2010 |
| CN | 102223715 | 10/2011 |
| CN | 105144809 | 12/2015 |
| CN | 108401484 | 8/2018 |
| CN | 108631997 | 10/2018 |
| EP | 3512140 | 7/2019 |
| EP | 3866376 B1 * | 9/2022 ........... H04L 1/1812 |

(Continued)

OTHER PUBLICATIONS

R2-1707366 (Year: 2017).*

(Continued)

*Primary Examiner* — Intekhaab A Siddiquee
(74) *Attorney, Agent, or Firm* — Hodgson Russ LLP

(57) ABSTRACT

A method for data processing includes the following. A terminal device determines a data duplication behavior of a first entity according to first information, where the data duplication behavior is indicative of that the first entity transmits data to at least one second entity in at least three second entities corresponding to the first entity. The first information includes information from a media access control (MAC) control element (CE). The terminal device determines the data duplication behavior of the first entity as follows. The terminal device determines a data duplication behavior of a first set according to the information from the MAC CE, where the first set is formed according to the at least three second entities and contains at least one second entity. A terminal device and a non-transitory computer readable storage medium are further provided.

17 Claims, 3 Drawing Sheets

(56) References Cited

U.S. PATENT DOCUMENTS

2021/0298120 A1* 9/2021 Sharma .............. H04W 12/033

FOREIGN PATENT DOCUMENTS

| KR | 20100122054 | | 11/2010 | | |
|----|---|---|---|---|---|
| RU | 2392752 | | 6/2010 | | |
| WO | 2017182927 | A1 | 10/2017 | | |
| WO | 2018143600 | | 8/2018 | | |
| WO | WO-2018143600 | A1 * | 8/2018 | ............. | H04L 1/189 |
| WO | 2018171512 | A1 | 9/2018 | | |
| WO | 2018171734 | | 9/2018 | | |
| WO | WO-2018172136 | A1 * | 9/2018 | ........... | H04B 17/309 |
| WO | 2018204828 | | 11/2018 | | |
| WO | WO-2018228134 | A1 * | 12/2018 | ............. | H04L 1/189 |

OTHER PUBLICATIONS

R2-1706716 (Year: 2017).*
WIPO, ISR for PCT/CN2018/112648, dated Aug. 8, 2019.
IPI, Office Action for IN Application No. 202017048279, dated Dec. 31, 2021.
FSIP, Office Action for RU Application No. 2021107325/07, dated Nov. 30, 2021.
EPO, Extended European Search Report for EP Application No. 18938444.9, dated Apr. 15, 2021.
CNIPA, First Office Action for ON Application No. 202110420346.7, dated Jul. 27, 2022.
JPO, Office Action for JP Application No. 2021-511575, dated Jul. 22, 2022.
CNIPA, Second Office Action for CN Application No. 202110420346.7, dated Oct. 27, 2022.
3GPP, "3rd Generation Partnership Project; Technical Specification Group Services and System Aspects; Release 15 Description; Summary of Rel-15 Work Items (Release 15)," 3GPP TR 21.915 V0.2.0 (Jul. 2018), 2018.
IPOS, Written Opinion and Search Report SG Application No. 11202102227V, dated Nov. 28, 2022.
CNIPA, Third Office Action for CN Application No. 202110420346.7, dated Jan. 19, 2023.

* cited by examiner

| Determine a data duplication behavior of a first entity according to first information | 201 |

METHOD FOR DATA PROCESSING, TERMINAL DEVICE, AND STORAGE MEDIUM

CROSS-REFERENCE TO RELATED APPLICATION(S)

This application is a continuation of International Application No. PCT/CN2018/112648, filed on Oct. 30, 2018, the entire disclosure of which is incorporated by reference herein.

TECHNICAL FIELD

This disclosure relates to the technical field of wireless communication, and in particular, to a method for data processing, a terminal device, and a non-transitory computer readable storage medium.

BACKGROUND

Carrier aggregation (CA) scenario or dual connectivity scenario in the $5^{th}$ generation (5G) new radio (NR) system supports usage of a protocol layer, for example, a duplication function of a packet data convergence protocol (PDCP) is used to realize data duplication and transmission. However, at present, there is no effective technical solution to realize a data duplication function of the protocol layer for more than two protocol data unit (PDU) copies and establish a bearer with the data duplication function in the protocol layer.

SUMMARY

To solve the above technical problems, a method for data processing, a terminal device, and a non-transitory computer readable storage medium are provided according to implementations of the present disclosure.

In a first aspect, a method for data processing is provided according to the implementations of the present disclosure. A terminal device determines a data duplication behavior of a first entity according to first information, where the data duplication behavior is indicative of that the first entity transmits data to at least one second entity in at least three second entities corresponding to the first entity, and the first information includes information from a media access control (MAC) control element (CE). The terminal device determines the data duplication behavior of the first entity according to the first information as follows. The terminal device determines a data duplication behavior of a first set according to the information from the MAC CE, where the first set is formed according to the at least three second entities and contains at least one second entity.

In a second aspect, a terminal device is provided according to the implementations of the present disclosure. The terminal device includes a processor and a memory configured to store at least one computer program. The at least one computer program, when executed, is operable with the processor to perform the following. Determine a data duplication behavior of a first entity according to first information, where the data duplication behavior is indicative of that the first entity transmits data to at least one second entity in at least three second entities corresponding to the first entity, and the first information includes information from a MAC CE. The at least one computer program operable with the processor to determine the data duplication behavior of the first entity according to the first information is operable with the processor to determine a data duplication behavior of a first set according to the information from the MAC CE, where the first set is formed according to the at least three second entities and contains at least one second entity.

In a third aspect, a non-transitory computer readable storage medium is provided according to the implementations of the present disclosure. The at least one computer program, when executed, is operable with the processor to perform the following. Determine a data duplication behavior of a first entity according to first information, where the data duplication behavior is indicative of that the first entity transmits data to at least one second entity in at least three second entities corresponding to the first entity, and the first information includes information from a MAC CE. The at least one computer program operable with the processor to determine the data duplication behavior of the first entity according to the first information is operable with the processor to determine a data duplication behavior of a first set according to the information from the MAC CE, where the first set is formed according to the at least three second entities and contains at least one second entity.

DETAILED DESCRIPTION

In order to understand features and technical contents of implementations of the present disclosure in detail, the implementations of the present disclosure will be described in detail below with reference to accompanying drawings. The attached accompanying drawings are merely used for reference and explanation and not used to limit the implementations of the present disclosure.

Before describing the implementations of the present disclosure in detail, data duplication is first briefly illustrated.

Figure 1:
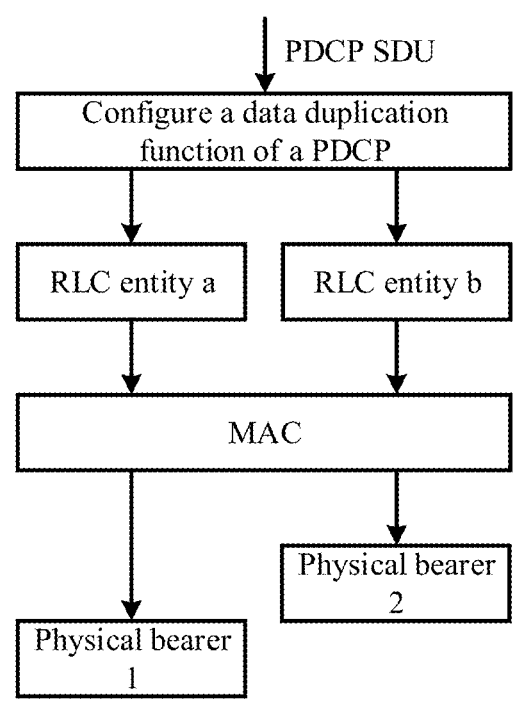
FIG. 1 is a schematic diagram illustrating that a duplication function of a PDCP is used to realize data duplication and transmission in related art.

As illustrated in FIG. 1, when a duplication function of a PDCP is used to implement data duplication and transmission, PDCP PDUs duplicated with the PDCP are transmitted to two radio link control (RLC) entities, respectively, and it is ensured that the PDCP PDUs duplicated can be transmitted on different physical layer aggregation carriers, thereby achieving a frequency diversity gain to improve reliability of data transmission.

The present disclosure provides a method for data processing. The method for data processing in the implementations of the present disclosure can be applied to various communication systems, such as a global system of mobile communication (GSM) system, a code division multiple access ((CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunication system (UMTS), a worldwide interoperability for microwave access (WiMAX) communication system, a 5G system, or the like.

Figures 2, 3:
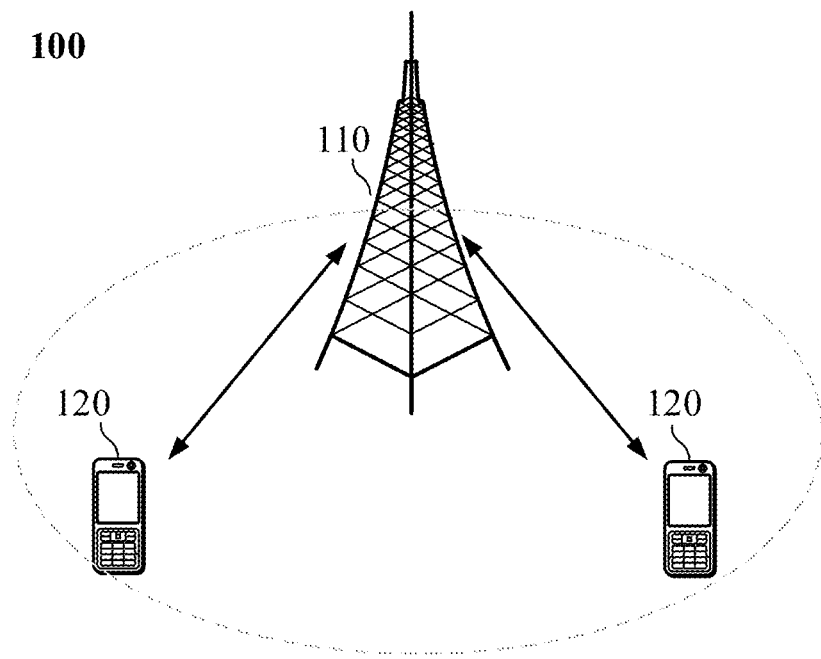
FIG. 2 is a schematic structural diagram illustrating a communication system according to an implementation of the present disclosure.
FIG. 3 is a schematic diagram illustrating an optional process flow of a method for data processing according to an implementation of the present disclosure.

A communication system 100 in an implementation of the present disclosure is illustrated in FIG. 2. The communication system 100 may include a network device 110. The network device 110 can communicate with a terminal device 120 (or called a communication terminal or a terminal). The network device 110 can provide communication coverage for a specific geographic area and communicate with terminal devices in the coverage area. In an implementation, the network device 110 may be a base station (base transceiver station, BTS) in the GSM system or CDMA system, a base station (NodeB, NB) in the WCDMA system, an evolutional base station (evolutional node B, eNB or eNodeB) in the LTE system, or a wireless controller in a cloud radio access network (CRAN). In an implementation, the network device 110 may be a mobile switch center, a relay station, an access point, a vehicle-mounted device, a wearable device, a hub, a switch, a network bridge, a router, a network-side device in the 5G network, a network device in a future evolution public land mobile network (PLMN), or the like.

The communication system 100 further includes at least one terminal device 120 in the coverage area of the network device 110. The "terminal device" used herein can include but is not limited to a device coupled via a wired line, and/or other data connection/network, and/or a wireless interface, and/or a device communicating with another terminal device to receive/transmit communication signals, and/or an Internet of Things (IoT) device. Examples of the wired line may include, but are not limited to, at least one of a public switched telephone network (PSTN), a digital subscriber line (DSL), a digital cable, and a direct connection cable. Examples of the wireless interface may include, but are not limited to, a wireless interface for a cellular network, a WLAN, a digital television network (such as a digital video broadcasting-handheld (DVB-H) network), a satellite network, and an amplitude modulation-frequency modulation (AM-FM) broadcast transmitter. A terminal device configured to communicate via a wireless interface may be called a "wireless communication terminal", a "wireless terminal", and/or a "mobile terminal". Examples of a mobile terminal may include, but are not limited to, a satellite or cellular telephone, a personal communication system (PCS) terminal capable of combining cellular radio telephone, data processing, fax, and data communication, a personal digital assistant (PDA) equipped with radio telephone, pager, Internet/Intranet access, web browsing, notebook, calendar, and/or a global positioning system (GPS) receiver, and a conventional laptop and/or a handheld receiver or other electronic devices equipped with a radio telephone transceiver. The terminal device may refer to an access terminal, user equipment (UE), a user unit, a user station, a mobile station, a remote station, a remote terminal, a mobile device, a user terminal, a terminal, a wireless communication device, a user agent, or a user device. The access terminal may be a cellular phone, a cordless phone, a session initiation protocol (SIP) phone, a wireless local loop (WLL) station, a PDA, a handheld device with a wireless communication function, a computing device, other processing devices coupled with wireless modems, a vehicle-mounted device, a wearable device, a terminal device in the 5G network or the future evolution PLMN, or the like.

In an implementation, the terminal devices 120 may communication with each other via device to device (D2D) communication.

In an implementation, the 5G system or 5G network may also be referred to as an NR system or NR network.

FIG. 2 illustrates a network device and two terminal devices. In an implementation, the communication system 100 may include multiple network devices, and in the coverage area of each network device, there may be one or more terminal devices, which is not limited in the implementation of the present disclosure.

In an implementation, the communication system 100 may further include a network controller, a mobility management entity (MME), or other network entities, which is not limited in the implementation of the present disclosure.

It is to be understood that in the implementation of the present disclosure in a network/system, a device with a communication function can be called a communication device. The communication system 100 illustrated in FIG. 2 is taken as an example. The communication device may include the network device 110 and the terminal device 120 that have a communication function. The network device 110 and the terminal device 120 may be the devices described above, which is not repeated herein. The communication device may further include other devices in the communication system 100, such as the network controller, the MME, or other network entities, which is not limited in the implementation of the present disclosure.

As illustrated in FIG. 3, in an implementation of the present disclosure, an optional process flow of a method for data processing applied to a terminal device includes the following.

At block 201, the terminal device determines a data duplication behavior of a first entity according to first information.

Herein, the data duplication behavior is indicative of that the first entity transmits data to at least one second entity in at least three second entities corresponding to the first entity.

In some implementations, the terminal device configures at least three second entities for the first entity, and the data duplication behavior is indicative of that the first entity transmits data to which of the at least three second entities corresponding to the first entity.

In an implementation, the first entity is a PDCP entity, and the second entity is an RLC entity.

In some implementations, the first information includes at least one of the following: information from a radio resource control (RRC) layer, information from a media access control (MAC) control element (CE), and relevant information of the terminal device. The relevant information such as channel information, the amount of data that the terminal device can transmit and the like is measured by the terminal device.

In some implementations, the terminal device determines the data duplication behavior of the first entity according to the first information as follows. The terminal device determines, according to the information from the MAC CE, a data duplication behavior of a first set formed according to the at least three second entities, where the first set contains at least one second entity.

In some implementations, the terminal device determines the data duplication behavior of the first entity according to the first information as follows. The terminal device determines, according to the information from the RRC layer, a data duplication behavior of a second set formed according to the at least three second entities, where the second set contains at least one second entity.

In some implementations, the terminal device determines the data duplication behavior of the first entity according to the first information as follows. The terminal device determines, according to the relevant information of the terminal device, a data duplication behavior of a third set formed according to the at least three second entities, where the third set contains at least one second entity. The relevant information such as the channel information, the amount of data that the terminal device can transmit and the like is measured by the terminal device.

In an implementation, the first set and the second set do not contain a same second entity, and/or the second set and the third set do not contain a same second entity, and/or the first set and the third set do not contain a same second entity. For example, the second entities include second entities 1, 2, 3, 4, 5, and 6, the first set contains the second entities 1 and 2, the second set contains the second entities 3 and 4, and the third set contains the second entities 5 and 6.

In an implementation, the first set and the second set contain a same second entity, and/or the second set and the third set contain a same second entity, and/or the first set and the third set contain a same second entity. For example, the second entities include the second entities 1, 2, 3, and 4, the first set contains the second entities 1, 2, and 3, the second set contains the second entities 2, 3, and 4, and the third set contains the second entities 1, 2, and 4.

When the first set and the second set contain a same second entity, and/or the second set and the third set contain a same second entity, and/or the first set and the third set contain a same second entity, the terminal device determines, according to the first information, a data duplication behavior of a same second entity in two sets.

Take that the second entities include the second entities 1, 2, 3, and 4, the first set contains the second entities 1, 2, and 3, the second set contains the second entities 2, 3, and 4, and the third set contains the second entities 1, 2, and 4 as an example, the first set and the second set both contain the second entities 2 and 3, and the terminal device determines a duplication behavior of the second entity 2 and the second entity 3 according to the first information. The first set and the second set both contain the second entity 2, and the terminal device determines the duplication behavior of the second entity 2 according to the first information. For example, the first set and the third set both contain the second entity 2, and the terminal device determines the duplication behavior of the second entity 2 according to the information from the MAC CE. For another example, the first set and the third set both contain the second entity 2, and the terminal device determines the duplication behavior of the second entity 2 according to the information from the RRC layer. For yet another example, the first set and the third set both contain the second entity 2, and the terminal device determines the duplication behavior of the second entity 2 according to the relevant information of the terminal device.

In some implementation, the information from the MAC CE includes information from a MAC CE in a master node (also referred to as a master cell group) and/or information from a MAC CE in a secondary node (also referred to as a secondary cell group). The information from the MAC CE in the master node is 1-bit information, 2-bit information, 3-bit information, or 4-bit information. The information from the MAC CE in the secondary node is 1-bit information, 2-bit information, 3-bit information, or 4-bit information.

In an implementation, the information from the MAC CE is used to control the data duplication behavior of at least one second entity in the first set. Still take that the first set contains the second entities 1, 2, and 3 as an example, the information from the MAC CE is used to control the data duplication behavior of at least one second entity in the second entities 1, 2, 3.

In some implementations, the information from the MAC CE in the master node or secondary node that may be 1-bit information, 2-bit information, 3-bit information, or 4-bit information is used to control a first sub-set in the first set.

The information from the MAC CE in the secondary node that may be 1-bit information, 2-bit information, 3-bit information, or 4-bit information is used to control a second sub-set in the first set In some implementations, the first sub-set and the second sub-set may contain a same second entity. Still take that the first set contains the second entities 1, 2, and 3 as an example, the first sub-set contains the second entities 2 and 3, and the second sub-set contains the second entities 2 and 3.

In some implementations, the first sub-set contains the second entity that is not contained in the second sub-set. Still take that the first set contains the second entities 1, 2, and 3 as an example, the first sub-set contains the second entities 2 and 3, and the second sub-set contains the second entity 2. Under this condition, the first sub-set contains the second entity 3 that is not contained in the second sub-set.

In some implementations, the second sub-set contains the second entity that is not contained in the first sub-set. Still take that the first set contains the second entities 1, 2, and 3 as an example, the first sub-set contains the second entity 3, and the second sub-set contains the second entities 2 and 3. Under this condition, the second sub-set contains the second entity 2 that is not contained in the first sub-set.

In some implementations, the first sub-set and the second sub-set do not contain a same second entity. Still take that the first set contains the second entities 1, 2, and 3 as an example, the first sub-set contains the second entity 2, and the second sub-set contains the second entities 1 and 3. Under this condition, the second sub-set and the first sub-set do not contain a same second entity.

The first set, the second set, the third set, the first sub-set, and the second sub-set referred in the above implementation of the present disclosure can be determined according to RRC signals.

In some implementations, the first set, the second set, the third set, the first sub-set, and the second sub-set referred in the above implementation of the present disclosure can be determined according to a third entity to which the second entity belongs.

When the second entity is the RLC entity, the third entity is a MAC entity to which the RLC entity belongs.

In the implementations of the present disclosure, the terminal device determines the data duplication behavior of the first entity according to the information from the RRC layer, and/or the information from the MAC CE, and/or the relevant information of the terminal device measured by the terminal device, configures a data duplication function for the first entity, and establishes a bearer with the data duplication function.

Figure 4:
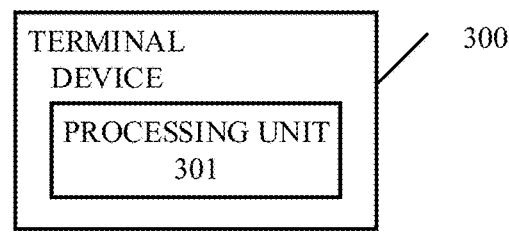
FIG. 4 is a schematic structural diagram illustrating a terminal device according to an implementation of the present disclosure.

Implementations of the present disclosure further provides a terminal device. As illustrated in FIG. 4, the terminal device 300 includes a processing unit 301 configured to determine a data duplication behavior of a first entity according to first information.

Herein, the data duplication behavior is indicative of that the first entity transmits data to at least one second entity in at least three second entities corresponding to the first entity.

In some implementations, the terminal device configures at least three second entities for the first entity, and the data duplication behavior is indicative of that the first entity transmits data to which of the at least three second entities corresponding to the first entity.

In an implementation, the first entity is a PDCP entity, and the second entity is an RLC entity.

In some implementations, the first information includes at least one of the following: information from a RRC layer, information from a MAC CE, and relevant information of the terminal device. The relevant information such as channel information, the amount of data that the terminal device can transmit and the like is measured by the terminal device.

In some implementations, the processing unit 301 determines the data duplication behavior of the first entity according to the first information as follows. The processing unit 301 determines, according to the information from the MAC CE, a data duplication behavior of a first set formed according to the at least three second entities, where the first set contains at least one second entity.

In some implementations, the processing unit 301 determines the data duplication behavior of the first entity according to the first information as follows. The processing unit 301 determines, according to the information from the RRC layer, a data duplication behavior of a second set formed according to the at least three second entities, where the second set contains at least one second entity.

In some implementations, the processing unit 301 determines the data duplication behavior of the first entity according to the first information as follows. The processing unit 301 determines, according to the relevant information of the terminal device, a data duplication behavior of a third set formed according to the at least three second entities, where the third set contains at least one second entity. The relevant information such as the channel information, the amount of data that the terminal device can transmit and the like is measured by the terminal device.

In an implementation, the first set and the second set do not contain a same second entity, and/or the second set and the third set do not contain a same second entity, and/or the first set and the third set do not contain a same second entity. For example, the second entities include second entities 1, 2, 3, 4, 5, and 6, the first set contains the second entities 1 and 2, the second set contains the second entities 3 and 4, and the third set contains the second entities 5 and 6.

In an implementation, the first set and the second set contain a same second entity, and/or the second set and the third set contain a same second entity, and/or the first set and the third set contain a same second entity. For example, the second entities include the second entities 1, 2, 3, and 4, the first set contains the second entities 1, 2, and 3, the second set contains the second entities 2, 3, and 4, and the third set contains the second entities 1, 2, and 4.

When the first set and the second set contain a same second entity, and/or the second set and the third set contain a same second entity, and/or the first set and the third set contain a same second entity, the processing unit 301 determines, according to the first information, a data duplication behavior of a same second entity in two sets.

Still take that the second entities include the second entities 1, 2, 3, and 4, the first set contains the second entities 1, 2, and 3, the second set contains the second entities 2, 3, and 4, and the third set contains the second entities 1, 2, and 4 as an example, the first set and the second set both contain the second entities 2 and 3, and the processing unit 301 determines a duplication behavior of the second entity 2 and the second entity 3 according to the first information. The first set and the second set both contain the second entity 2, and the processing unit 301 determines the duplication behavior of the second entity 2 according to the first information. For example, the first set and the third set both contain the second entity 2, and the processing unit 301 determines the duplication behavior of the second entity 2 according to the information from the MAC CE. For another example, the first set and the third set both contain the second entity 2, and the processing unit 301 determines the duplication behavior of the second entity 2 according to the information from the RRC layer. For yet another example, the first set and the third set both contain the second entity 2, and the processing unit 301 determines the duplication behavior of the second entity 2 according to the relevant information of the terminal device.

In some implementation, the information from the MAC CE includes information from a MAC CE in a master node and/or information from a MAC CE in a secondary node. The information from the MAC CE in the master node is 1-bit information, 2-bit information, 3-bit information, or 4-bit information. The information from the MAC CE in the secondary node is 1-bit information, 2-bit information, 3-bit information, or 4-bit information.

In an implementation, the information from the MAC CE is used to control the data duplication behavior of at least one second entity in the first set. Still take that the first set contains the second entities 1, 2, and 3 as an example, the information from the MAC CE is used to control the data duplication behavior of at least one second entity in the second entities 1, 2, and 3.

In some implementations, the information from the MAC CE in the master node or secondary node that may be 1-bit information, 2-bit information, 3-bit information, or 4-bit information is used to control a first sub-set in the first set.

The information from the MAC CE in the secondary node that may be 1-bit information, 2-bit information, 3-bit information, or 4-bit information is used to control a second sub-set in the first set In some implementations, the first sub-set and the second sub-set may contain a same second entity. Still take that the first set contains the second entities 1, 2, and 3 as an example, the first sub-set contains the second entities 2 and 3, and the second sub-set contains the second entities 2 and 3.

In some implementations, the first sub-set contains the second entity that is not contained in the second sub-set. Still take that the first set contains the second entities 1, 2, and 3 as an example, the first sub-set contains the second entities 2 and 3, and the second sub-set contains the second entity 2. Under this condition, the first sub-set contains the second entity 3 that is not contained in the second sub-set.

In some implementations, the second sub-set contains the second entity that is not contained in the first sub-set. Still take that the first set contains the second entities 1, 2, and 3 as an example, the first sub-set contains the second entity 3, and the second sub-set contains the second entities 2 and 3. Under this condition, the second sub-set contains the second entity 2 that is not contained in the first sub-set.

In some implementations, the first sub-set and the second sub-set do not contain a same second entity. Still take that the first set contains the second entities 1, 2, and 3 as an example, the first sub-set contains the second entity 2, and the second sub-set contains the second entities 1 and 3. Under this condition, the second sub-set and the first sub-set do not contain a same second entity.

The first set, the second set, the third set, the first sub-set, and the second sub-set referred in the above implementation of the present disclosure can be determined according to RRC signals.

In some implementations, the first set, the second set, the third set, the first sub-set, and the second sub-set referred in the above implementation of the present disclosure can be determined according to a third entity to which the second entity belongs.

When the second entity is the RLC entity, the third entity is a MAC entity to which the RLC entity belongs.

Implementations of the present disclosure further provide a terminal device. The terminal device includes a processor and a memory configured to store at least one computer program capable of being run in the processor. The processor is configured to run the at least one computer program to perform the above method for data processing performed by the terminal device.

Figure 5:
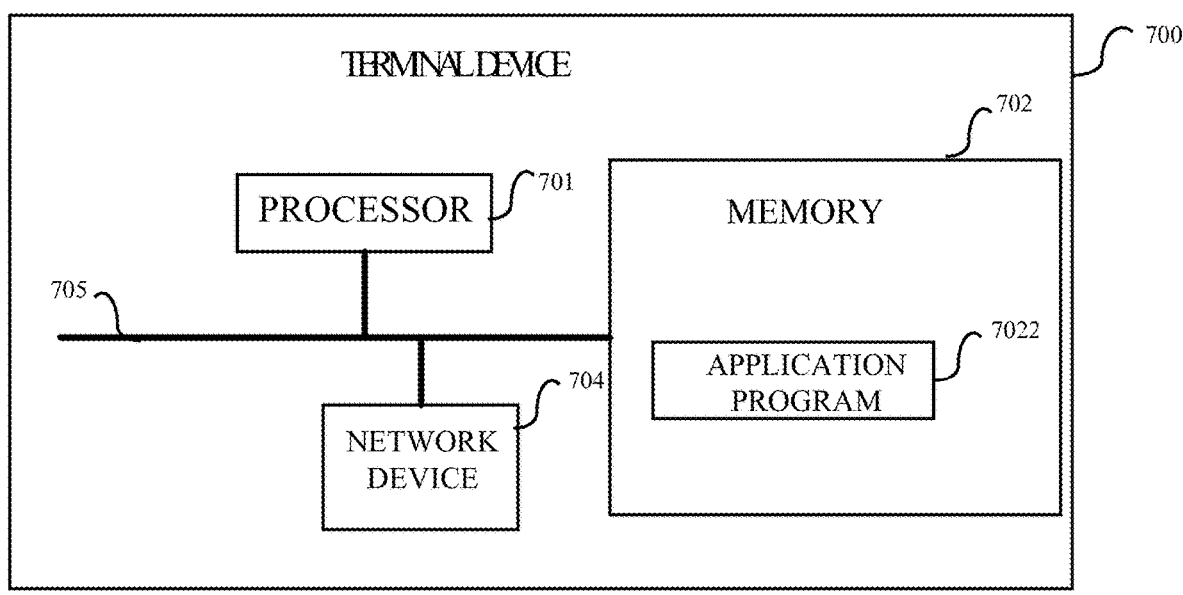
FIG. 5 is a schematic hardware structural diagram illustrating a terminal device according to an implementation of the present disclosure.

FIG. 5 is a schematic hardware structural diagram illustrating a terminal device according to an implementation of the present disclosure. The terminal device 700 includes at least one processor 701, a memory 702, and at least one network interface 704. Various components of the terminal device 700 are coupled with each other via a bus system 705. It can be understood that the bus system 705 is configured to realize a connection communication among these components. The bus system 705 not only includes a data bus, but also includes a power bus, a control bus, and a state signal bus. However, for the sake of clear illustration, in FIG. 5 various buses are called the bus system 705.

It can be understood that the memory 702 may be a volatile memory or a non-volatile memory, and may also include both the volatile memory and non-volatile memory. The non-volatile memory may be a read-only memory (ROM), a programmable read-only memory (PROM), an erasable programmable read-only memory (EPROM), an electrically erasable programmable read-only memory (EEPROM), a ferromagnetic random access memory (FRAM), a flash memory, a magnetic surface memory, a disc, or a compact disc read-only memory (CD-ROM). The magnetic surface memory may be a disk memory or a magnetic tape memory. The volatile memory may be a random access memory (RAM) and used for external high-speed cache. By way of examples, but not limitation, various random access memories can be used, for example, a static random access memory (SRAM), a synchronous static random access memory (SSRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synclink dynamic random access memory (SLDRAM), and a direct rambus random access memory (DRRAM). The memory 702 described in this implementation of the present disclosure is intended to include but is not limited to these and any other suitable types of memory.

The memory 702 in the implementation of the present disclosure is configured to store various types of data to support operations of the terminal device 700. Examples of these data include any computer program operated on the terminal device 700, such as an application program 7022. The program for implementing the method provided in the implementation of the present disclosure may be contained in the application program 7022.

The methods disclosed in the foregoing implementations of the present disclosure may be applied to the processor 701 or implemented by the processor 701. The processor 701 may be an integrated circuit chip with signal processing capabilities. In the implementation process, each step of the above methods may be completed by an integrated logic circuit in the form of hardware in the processor 701 or an instruction in the form of software. The above-mentioned processor 701 may be a general-purpose processor, a digital signal processor (DSP), or other programmable logic device, a discrete gate, a transistor logic device, a discrete hardware assembly, and the like. The processor 701 may implement or execute the methods, steps, and logical block diagrams disclosed in the implementations of the present disclosure. The general-purpose processor may be a microprocessor or any conventional processor. The steps of the methods disclosed in the implementations of the present disclosure may be directly executed and completed by a hardware decoding processor, or may be executed and completed by a combination of hardware and software modules in the decoding processor. The software modules may be in a storage medium. The storage medium is in the memory 702. The processor 701 reads information in the memory 702 and completes the steps of the foregoing methods in combination with hardware of the processor 701.

In an exemplary implementation, the terminal device 700 may be implemented with one or more application specific integrated circuits (ASICs), DSPs, programmable logic devices (PLDs), complex programmable logic devices (CPLDs), field-programmable gate arrays (FPGAs), general-purpose processors, controllers, micro control units (MCUs), microprocessor unit (MPUs), or other electronic components, and the terminal device 700 is configured to implement the aforementioned methods.

Implementations of the present disclosure further provide a computer-readable storage medium configured to store at least one computer program.

In an implementation, the computer-readable storage medium can be applied to the terminal device in the implementation of the present disclosure. The computer program enables a computer to perform corresponding procedures of various methods performed by the terminal device according to the implementation of the present disclosure, which is not repeated herein for clarity.

The present disclosure is described with reference to flowcharts and/or block diagrams of the methods, devices (systems), and computer program products provide in the implementations of the present disclosure. It can be understood that each flow in the flow chart and/or each block in the block diagram and a combination of flows in the flow chart and/or blocks in the block diagram may be implemented by computer program instructions. These computer program instructions can be in a processor of a general-purpose computer, a special-purpose computer, an embedded processing machine, or other programmable data processing device to produce a machine, so as to produce a device with instructions executed by the processor of the computer or other programmable data processing device, where the device is configured to realize functions specified in one flow or multiple flows in a flow chart and/or one block or multiple blocks in a block diagram.

These computer program instructions may also be stored in a computer readable memory that can guide a computer or other programmable data processing device to work in a specific manner, so that the instructions stored in the computer readable memory can enable a generation of a product including an instruction device. The instruction device implements the functions specified in one flow or multiple flows in a flow chart and/or one block or multiple blocks in a block diagram.

These computer program instructions can also be loaded onto a computer or other programmable data processing device, so that a series of operating steps can be performed on the computer or other programmable device to generate computer-implemented processing, and thus the instructions executed on the computer or other programmable device can provide steps for implementing the functions specified in one flow or multiple flows in a flow chart and/or one block or multiple blocks in a block diagram.

The above are only preferred implementations of the present disclosure and not intended to limit the protection scope of the present disclosure. Any modification, equivalent replacement and improvement made within the spirit and principle of the present disclosure should be within the protection scope of the present disclosure.

What is claimed is:

1. A method for data processing, comprising:
   determining, by a terminal device, a data duplication behavior of a first entity according to first information, wherein the data duplication behavior is indicative of that the first entity transmits data to at least one second entity in at least three second entities corresponding to the first entity, and the first information comprises information from a media access control (MAC) control element (CE);
   wherein determining, by the terminal device, the data duplication behavior of the first entity according to the first information comprises:
      determining, by the terminal device, a data duplication behavior of a first set according to the information from the MAC CE, wherein the first set is formed according to the at least three second entities and contains at least one second entity;
   wherein the information from the MAC CE comprises information from a MAC CE in a master node and information from a MAC CE in a secondary node, wherein the information from the MAC CE in the master node and the information from the MAC CE in the secondary node have different number of bits, wherein the information from the MAC CE in the master node has one of 1-bit, 2-bit, 3-bit, and 4-bit, and the information from the MAC CE in the secondary node has another one of 1-bit, 2-bit, 3-bit, and 4-bit;
   wherein the information from the MAC CE in the master node is configured to control a first sub-set in the first set;
   wherein the information from the MAC CE in the secondary node is configured to control a second sub-set in the first set; and
   wherein the first sub-set contains a second entity that is not contained in the second sub-set, or the second sub-set contains a second entity that is not contained in the first sub-set.

2. The method of claim 1, wherein the first information further comprises information from a radio resource control (RRC) layer.

3. The method of claim 2, wherein determining, by the terminal device, the data duplication behavior of the first entity according to the first information comprises:
   determining, by the terminal device, a data duplication behavior of a second set according to the information from the RRC layer, wherein the second set is formed according to the at least three second entities and contains at least one second entity.

4. The method of claim 3, wherein the first information further comprises relevant information of the terminal device, wherein the relevant information is measured by the terminal device;
   wherein determining, by the terminal device, the data duplication behavior of the first entity according to the first information comprises:
      determining, by the terminal device, a data duplication behavior of a third set according to the relevant information of the terminal device, wherein the third set is formed according to the at least three second entities and contains at least one second entity.

5. The method of claim 4, wherein the first set and the second set do not contain a same second entity, or the second set and the third set do not contain a same second entity, or the first set and the third set do not contain a same second entity.

6. The method of claim 4, further comprising:
   determining, by the terminal device, a data duplication behavior of a same second entity in two sets according to the first information, wherein the first set and the second set contain a same second entity, or the second set and the third set contain a same second entity, or the first set and the third set contain a same second entity.

7. The method of claim 1, wherein the first entity is a packet data convergence protocol (PDCP) entity, and the second entity is a radio link control (RLC) entity.

8. A terminal device comprising:
   a processor; and
   a memory configured to store at least one computer program;
   wherein the at least one computer program, when executed, is operable with the processor to:
      determine a data duplication behavior of a first entity according to first information, wherein the data duplication behavior is indicative of that the first entity transmits data to at least one second entity in at least three second entities corresponding to the first entity, and the first information comprises information from a media access control (MAC) control element (CE);
   wherein the at least one computer program operable with the processor to determine the data duplication behavior of the first entity according to the first information is operable with the processor to:
      determine a data duplication behavior of a first set according to the information from the MAC CE, wherein the first set is formed according to the at least three second entities and contains at least one second entity;
   wherein the information from the MAC CE comprises information from a MAC CE in a master node and information from a MAC CE in a secondary node, wherein the information from the MAC CE in the master node and the information from the MAC CE in the secondary node have different number of bits, wherein the information from the MAC CE in the master node has one of 1-bit, 2-bit, 3-bit, and 4-bit, and the information from the MAC CE in the secondary node has another one of 1-bit, 2-bit, 3-bit, and 4-bit;
   wherein the information from the MAC CE in the master node is configured to control a first sub-set in the first set;
   wherein the information from the MAC CE in the secondary node is configured to control a second sub-set in the first set; and wherein the first sub-set and the second sub-set contain a same second entity, or the first sub-set and the second sub-set do not contain a same second entity.

9. The terminal device of claim 8, wherein the first information further comprises information from a radio resource control (RRC) layer.

10. The terminal device of claim 9, wherein the at least one computer program operable with the processor to determine the data duplication behavior of the first entity according to the first information is operable with the processor to:
   determine a data duplication behavior of a second set according to the information from the RRC layer, wherein the second set is formed according to the at least three second entities and contains at least one second entity.

11. The terminal device of claim 10, wherein the first information further comprises relevant information of the terminal device, wherein the relevant information is measured by the terminal device;
   wherein the at least one computer program operable with the processor to determine the data duplication behavior of the first entity according to the first information is operable with the processor to:
      determine a data duplication behavior of a third set according to the relevant information of the terminal device, wherein the third set is formed according to the at least three second entities and contains at least one second entity.

12. The terminal device of claim 11, wherein the at least one computer program is further operable with the processor to determine a data duplication behavior of a same second entity in two sets according to the first information, wherein the first set and the second set contain a same second entity, or the second set and the third set contain a same second entity, or the first set and the third set contain a same second entity.

13. The terminal device of claim 11, wherein the first set, the second set, and the third set are determined according to RRC signals or according to a third entity to which the second entity belongs, wherein the third entity is a MAC entity.

14. The terminal device of claim 8, wherein the first entity is a packet data convergence protocol (PDCP) entity, and the second entity is a radio link control (RLC) entity.

15. A non-transitory computer readable storage medium configured to store at least one computer program;
   wherein the at least one computer program, when executed by a processor, is operable with a terminal device to:
      determine a data duplication behavior of a first entity according to first information, wherein the data duplication behavior is indicative of that the first entity transmits data to at least one second entity in at least three second entities corresponding to the first entity, and the first information comprises information from a media access control (MAC) control element (CE);
   wherein the at least one computer program operable with the processor to determine the data duplication behavior of the first entity according to the first information is operable with the processor to:
      determine a data duplication behavior of a first set according to the information from the MAC CE, wherein the first set is formed according to the at least three second entities and contains at least one second entity;
   wherein the information from the MAC CE comprises information from a MAC CE in a master node and information from a MAC CE in a secondary node, wherein the information from the MAC CE in the master node and the information from the MAC CE in the secondary node have different number of bits, wherein the information from the MAC CE in the master node has one of 1-bit, 2-bit, 3-bit, and 4-bit, and the information from the MAC CE in the secondary node has another one of 1-bit, 2-bit, 3-bit, and 4-bit;
   wherein the information from the MAC CE in the master node is configured to control a first sub-set in the first set;
   wherein the information from the MAC CE in the secondary node is configured to control a second sub-set in the first set; and
   wherein the first sub-set and the second sub-set contain a same second entity, or the first sub-set and the second sub-set do not contain a same second entity.

16. The non-transitory computer readable storage medium of claim 15, wherein the first information further comprises information from a radio resource control (RRC) layer;
   wherein the at least one computer program operable with the terminal to determine the data duplication behavior of the first entity according to the first information is operable with the terminal device to:
      determine a data duplication behavior of a second set according to the information from the RRC layer, wherein the second set is formed according to the at least three second entities and contains at least one second entity.

17. The non-transitory computer readable storage medium of claim 15, wherein the first entity is a packet data convergence protocol (PDCP) entity, and the second entity is a radio link control (RLC) entity.

* * * * *